(12) United States Patent
Watanabe et al.

(10) Patent No.: US 10,751,874 B2
(45) Date of Patent: Aug. 25, 2020

(54) METHOD OF TEACHING ROBOT AND ROBOTIC ARM CONTROL DEVICE

(71) Applicant: KAWASAKI JUKOGYO KABUSHIKI KAISHA, Kobe-shi, Hyogo (JP)

(72) Inventors: Masayuki Watanabe, Kobe (JP); Masayuki Nishimura, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 367 days.

(21) Appl. No.: 15/768,802

(22) PCT Filed: Oct. 5, 2016

(86) PCT No.: PCT/JP2016/004493
§ 371 (c)(1),
(2) Date: Apr. 16, 2018

(87) PCT Pub. No.: WO2017/064851
PCT Pub. Date: Apr. 20, 2017

(65) Prior Publication Data
US 2018/0297197 A1    Oct. 18, 2018

(30) Foreign Application Priority Data

Oct. 14, 2015 (JP) ................................. 2015-202771

(51) Int. Cl.
*G06F 17/00* (2019.01)
*B25J 9/16* (2006.01)
*G05B 19/423* (2006.01)

(52) U.S. Cl.
CPC ............. *B25J 9/163* (2013.01); *B25J 9/1664* (2013.01); *G05B 19/423* (2013.01)

(58) Field of Classification Search
CPC ........ B25J 9/163; B25J 9/1664; G05B 19/423
(Continued)

(56) References Cited

U.S. PATENT DOCUMENTS 4,975,856 A * 12/1990 Vold ....................... B25J 9/1602
318/568.19
6,385,508 B1 * 5/2002 McGee ................... B25J 9/0081
285/189
(Continued)

FOREIGN PATENT DOCUMENTS

CN    1433352 A    7/2003
CN    102300679 A    12/2011
(Continued)

OTHER PUBLICATIONS

Nov. 16, 2017 Taiwanese Office Action and Search Report issued in Patent Application No. 105132722.
(Continued)

*Primary Examiner* — Ronnie M Mancho
(74) *Attorney, Agent, or Firm* — Oliff PLC (57) ABSTRACT

By repeating for each control axis, that an axis angle of each control axis of an arm is detected during a direct teaching of a robot, a current position of a standard point defined on the arm or a tool is obtained based on the axis angle, a position instruction value that uses a position obtained by projecting the current position on a given movement route (moving direction) is generated as a target position, and each control axis is driven based on the position instruction value, until a deviation of an instruction angle corresponding to the position instruction value and the detected axis angle, or a deviation of the position instruction value and the current position of the standard point corresponding to the detected axis angle reaches a given value or below, the robot is taught, after the deviation becomes the given value or below, positional information on the arm.

10 Claims, 6 Drawing Sheets

(58) Field of Classification Search
USPC .......................................................... 700/257
See application file for complete search history.

(56) References Cited

U.S. PATENT DOCUMENTS

| | | | | |
|---|---|---|---|---|
| 8,175,750 | B2* | 5/2012 | Tsusaka | ................. B25J 9/1664 |
| | | | | 700/250 |
| 8,909,374 | B2* | 12/2014 | Fudaba | ................... B25J 13/02 |
| | | | | 700/253 |
| 9,162,358 | B2* | 10/2015 | Geffard | ................. B25J 9/1679 |
| 9,434,073 | B2* | 9/2016 | Matsumoto | ............ B25J 9/1633 |
| 9,505,133 | B2* | 11/2016 | Osaka | ................... B25J 13/088 |
| 9,566,707 | B2* | 2/2017 | Iwatake | ................ B25J 13/085 |
| 9,902,059 | B2* | 2/2018 | Sonoda | ................. B25J 9/0081 |
| 9,919,422 | B1* | 3/2018 | Horton | ................... B25J 9/1633 |
| 10,471,593 | B2* | 11/2019 | Tsuchiya | ............ G05B 19/4065 |
| 10,564,635 | B2* | 2/2020 | Sato | ........................ B25J 13/085 |
| 2003/0025473 | A1 | 2/2003 | Nagata et al. | |
| 2005/0222714 | A1 | 10/2005 | Nihei et al. | |
| 2006/0178775 | A1* | 8/2006 | Zhang | ...................... B25J 13/02 |
| | | | | 700/245 |
| 2006/0208169 | A1* | 9/2006 | Breed | ................ G06K 9/00624 |
| | | | | 250/221 |
| 2009/0125146 | A1* | 5/2009 | Zhang | .................. G05B 19/243 |
| | | | | 700/253 |
| 2010/0312391 | A1* | 12/2010 | Choi | ...................... B25J 9/1656 |
| | | | | 700/254 |
| 2011/0208355 | A1 | 8/2011 | Tsusaka | |
| 2013/0345718 | A1* | 12/2013 | Crawford | ............... A61B 34/10 |
| | | | | 606/130 |
| 2015/0081098 | A1 | 3/2015 | Kogan | |

FOREIGN PATENT DOCUMENTS

| | | |
|---|---|---|
| CN | 104440913 A | 3/2015 |
| JP | H05-285870 A | 11/1993 |
| JP | H05-303425 A | 11/1993 |
| JP | H09-141580 A | 6/1997 |
| JP | H11-042575 A | 2/1999 |
| JP | H11-77560 A | 3/1999 |
| JP | 2000-084878 A | 3/2000 |
| JP | 2005-293098 A | 10/2005 |

OTHER PUBLICATIONS

Apr. 17, 2018 Taiwanese Office Action and Search Report issued in Patent Application No. 105132722.

* cited by examiner

METHOD OF TEACHING ROBOT AND ROBOTIC ARM CONTROL DEVICE

TECHNICAL FIELD

The present disclosure relates to a method of teaching a robot and a robotic arm control device.

BACKGROUND ART

Conventionally, an operating program of an industrial robot is created by an instruction to the robot, and the robot has a teaching playback function. As one of the teaching types of industrial robots as described above, a direct teaching type is known. By the direct teaching type, a teaching person, to performs the teaching by manually moving an arm of the robot to a position he/she wants to teach, and the robot itself stores positional information (i.e., taught position) of a position sensor. Patent Documents 1 and 2 disclose technologies related to this kind of teaching of the robot.

In a direct teaching type robot according to Patent Document 1, a force sensor which detects a force applied to a wrist part is provided to this wrist part, the robot operates by a compliance control which uses the detection signal as an input, the robot is moved by a teaching person applying a force to a tool, and the teaching person positions the tool at a position where the teaching person intends by a manual operation, to input the positional information into the robot. In this robot, upon the movement of a tip end of the tool, a free motion in which the operation of the robot is not restrained and a motion in which the operation is restrained on a specific straight line or a plane can be selected.

Moreover, in a robot teaching device according to Patent Document 2, a robot is moved according to a pressing force so that the robot becomes a taught position and posture, and the position and posture of the robot after movement are taught. In this robot teaching device, when the robot is within a given effective area, the external force applied to the robot is detected or estimated, and a movement based on the detected or estimated external force is permitted. This movement is restricted to a movement in a specific direction, and/or a change in the posture about the specific direction.

REFERENCE DOCUMENTS OF CONVENTIONAL ART

Patent Documents

[Patent Document 1] JP1997-141580A
[Patent Document 2] JP2005-293098A

DESCRIPTION OF THE DISCLOSURE

Problems to be Solved by the Disclosure

In the technologies of Patent Documents 1 and 2, the external force applied to the wrist part or the tool is detected or estimated, and the robot operates so that the tool is moved according to the external force. Thus, the robot is provided with the force sensor and the control becomes complicated. Moreover, since the robot operates based on the detected external force, a fine tuning of the position of the robotic arm or tool is difficult when the teaching person directly gives the force to move the robotic arm or tool.

The present disclosure is made in view of the situations described above, and one purpose thereof is to improve operability of a robotic arm and/or tool in direct teaching of a robot when a teaching person directly gives a force to move the robotic arm or tool.

Summary of the Disclosure

A method of teaching a robot according to one aspect of the present disclosure is a method of teaching a robot of a direct teaching type, in which the robot having at least one robotic arm to which a tool is attached is taught a position by a teaching person directly applying a force to move the robotic arm or the tool. The method includes restricting movement of a standard point defined on the robotic arm or the tool to a given movement route, repeating for each control axis that an axis angle of each control axis of the robotic arm is detected while the teaching person is moving the robotic arm or the tool, a current position of the standard point is obtained based on the axis angle, a position instruction value that uses a position obtained by projecting the current position on the given movement route is generated as a target position, and the each control axis is driven based on the position instruction value, until a deviation of the axis angle corresponding to the position instruction value and the detected axis angle, or a deviation of the position instruction value and the current position of the standard point corresponding to the detected axis angle reaches a given value or below, and teaching, after the deviation becomes the given value or below, positional information on the robotic arm to the robot.

Further, a robotic arm control device according to another aspect of the present disclosure is a robotic arm control device that moves a standard point set on a robotic arm. An axis angle of each control axis of the robotic arm is detected, a current position of the standard point is obtained based on the axis angle, a projected position is obtained by projecting the current position on a prestored movement route, a position instruction value is generated based on the projected position, and the standard point is further moved based on the position instruction value.

According to the method of teaching the robot and the robotic arm control device, during the direct teaching of the robot, each control axis is driven to assist a force which a teaching person gives to the robotic arm or the tool. Here, since the position instruction value is changed in turn based on each axis angle which changes in turn, the standard point will not move beyond the intention of the teaching person. Therefore, upon the positioning of the standard point in a desired teaching position, fine tuning of the position is easy. Moreover, since the robot is capable of performing the assist operation described above by demonstrating the functions which it has conventionally, a force sensor for detecting the external force given to the robotic arm and a control therefor are unnecessary.

Further, during the direct teaching of the robot, since the movement of the standard point defined on the robotic arm or the tool is restricted to the given movement route, the standard point moves along the given movement route even if the direction of the external force which the teaching person gives to the arm or the tool does not match with the moving direction of the standard point. Therefore, it becomes easy to move the standard point to the desired position of teaching person.

Moreover, since the force which the teaching person gives to the arm or the tool is assisted by the operation of each control axis under the direct teaching, the teaching person is able to move an axis even with a large static frictional force (e.g., an axis on a base end side of the arm) etc. with a comparatively small force.

Effect of the Disclosure

According to the present disclosure, in the direct teaching of the robot, the operability of the robotic arm and/or tool when the teaching person directly gives the force to move the robotic arm or tool is improved.

MODE FOR CARRYING OUT THE DISCLOSURE

Next, one embodiment of the present disclosure is described with reference to the drawings. An articulated robot according to one embodiment of the present disclosure (hereinafter, simply referred to as a "robot 1") is, for example, utilized in a production plant where electric and/or electronic components etc. are assembled to produce products by a line production method or a cell production method, and disposed along a workbench provided to this production plant, and capable of performing at least one of works, such as transferring, assembling or relocation of the components, and a posture conversion, to a workpiece on the workbench. Note that, the embodiment of the robot according to the present disclosure is not limited to the above, but is widely applicable to articulated robots regardless of horizontal articulated type or vertical articulated type.

Figure 1:
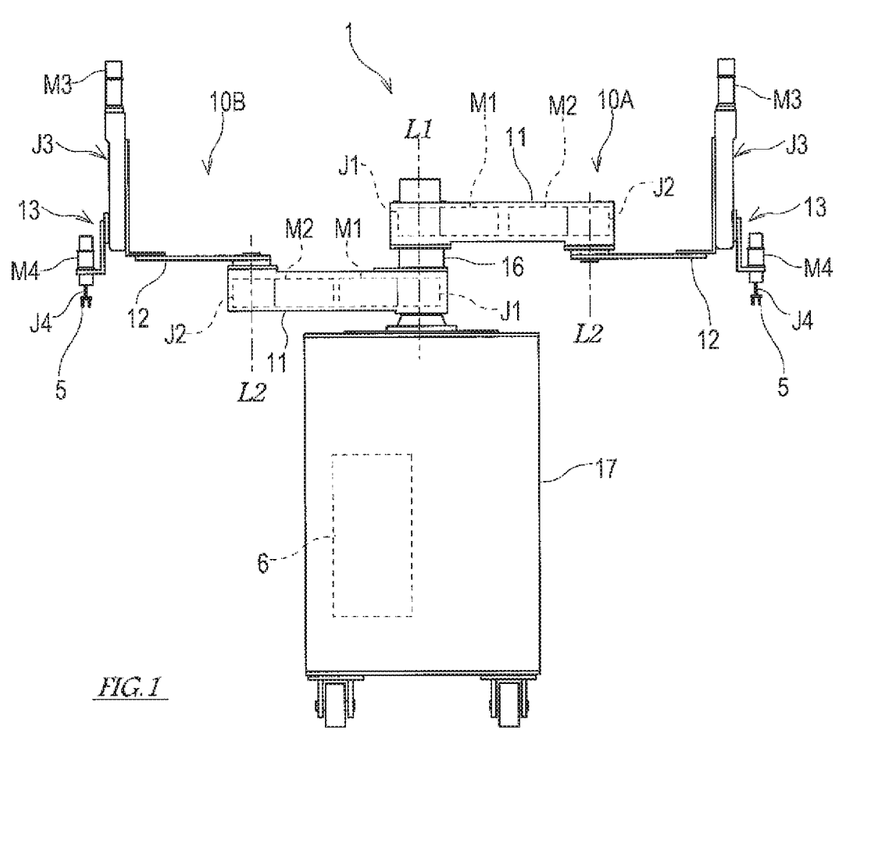
FIG. 1 is a schematic front view illustrating the overall structure of an articulated robot according to one embodiment of the present disclosure.
Figure 2:
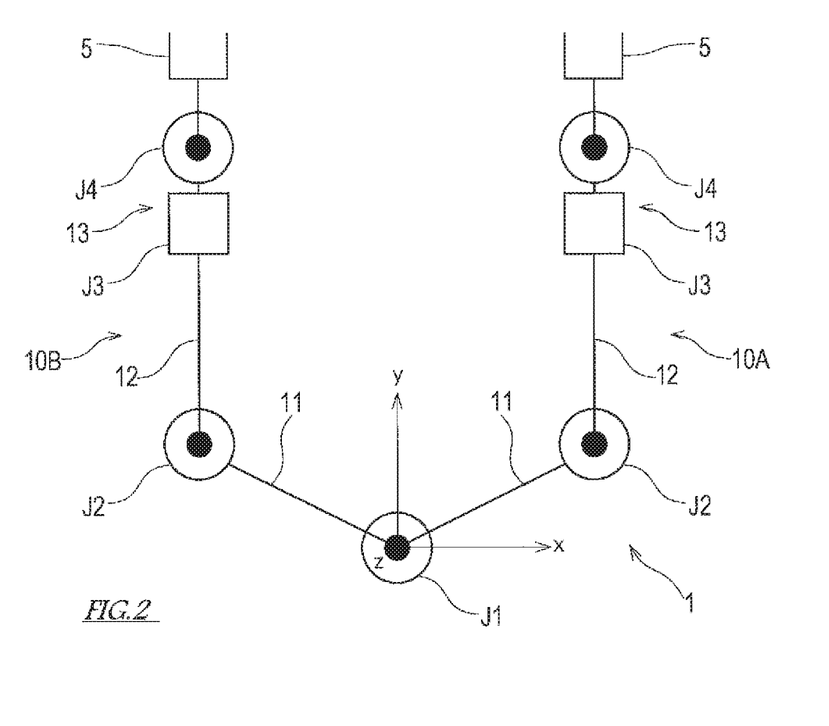
FIG. 2 is a schematic plan view of the robot.

First, an outline structure of the robot 1 is described. FIG. 1 is a front view illustrating the overall structure of the robot 1 according to one embodiment of the present disclosure, and FIG. 2 is a schematic plan view. As illustrated in FIGS. 1 and 2, the robot includes a hand cart 17, one pair of robotic arms (hereinafter, simply referred to as "the arm(s)") 10A and 10B which is supported by the hand cart 17, tools 5 (end effectors) attached to tip ends of the respective arms 10A and 10B, and a control device 6 which controls operations of the arms 10A and 10B and the tools 5.

The robot 1 according to this embodiment is a dual-arm robot provided with the left and right arms 10A and 10B. The left and right arms 10A and 10B is capable of operating independently or related to each other. Note that the robot 1 according to the present disclosure is not limited to the dual-arm robot, but may be provided with at least one arm. The left and right arms 10A and 10B have substantially the same structure and, thus, when not distinguishing the left and right arms 10A and 10B one from the other, they are indicated as "the arm(s) 10," while the alphabet which is a suffix is omitted.

Each arm 10 is the horizontal articulated type robotic arm, includes a first link 11, a second link 12, and a wrist part 13 having a mechanical interface to which the tool 5 is attached, and these are serially coupled.

The first link 11 is coupled to a base shaft 16 fixed to an upper surface of the hand cart 17 by a revolute joint. The first link 11 is rotatable on a vertical rotational axis L1 which passes through the axial center of the base shaft 16. Moreover, the second link 12 is coupled to a tip end of the first link 11 by a revolute joint. The second link 12 is rotatable on a vertical rotational axis L2 defined at the tip end of the first link 11.

The wrist part 13 is coupled to a tip end of the second link 12 through a prismatic joint and a revolute joint. The wrist part 13 is movable so as to ascend and descend with respect to the second link 12 by the prismatic joint. Moreover, the wrist part 13 is rotatable on a vertical rotational axis with respect to the second link 12 by the revolute joint.

The arm 10 of the structure described above has four control axes J1-J4 provided corresponding to the respective joints. The arm 10 is also provided with driving servo motors M1-M4, and encoders E1-E4 (see FIG. 3) which detect rotational angles of the servo motors M1-M4 so that they correspond to the control axes J1-J4, respectively. Note that, when not particularly distinguishing the control axes J1-J4 one from another, they are indicated as "the control axis J," while the number which is a suffix is omitted. When not particularly distinguishing the servo motors M1-M4 one from another, they are indicated as "the servo motor M," while the number which is a suffix is omitted, and when not particularly distinguishing the encoders E1-E4 one from another, they are indicated as "the encoder E," while the number which is a suffix is omitted.

The rotational axes L1 of the first links 11 of the two arms 10A and 10B of the structure described above are located on the same straight line, and the first link 11 of one of the arms 10A and the first link 11 of the other arm 10B are disposed with a vertical height difference. The origin in the basic coordinate system of the robot 1 is defined on the rotational axis L1 of the first link 11.

Next, the control device 6 is described. The control device 6 controls a normal operation and a teaching operation of the robot 1. Since configurations of control systems of the left and right arms 10A and 10B are substantially the same, the configuration of the control system of one of the arms 10 is described below.

Figure 3:
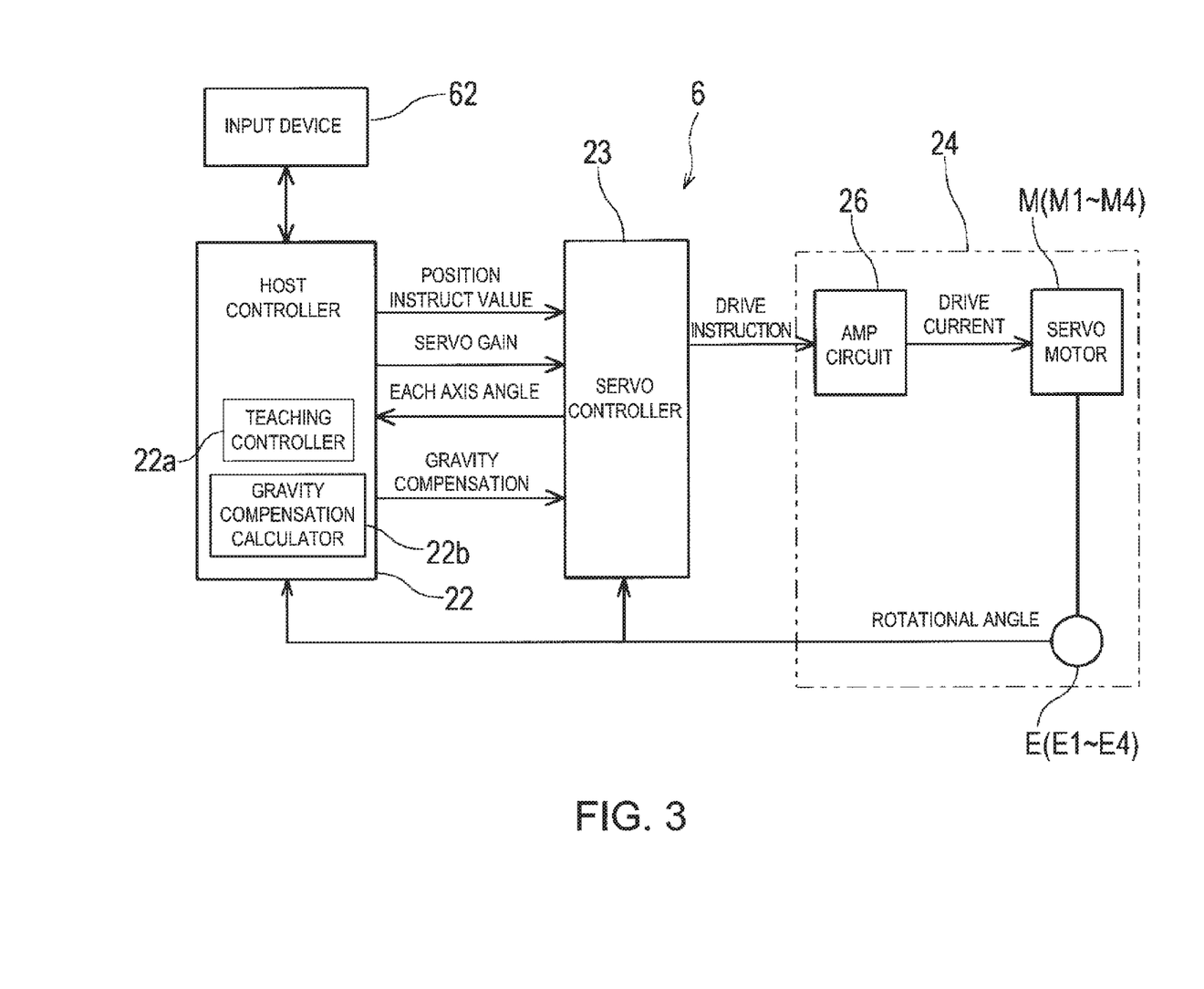
FIG. 3 is a view illustrating a configuration of a control system of the robot.

FIG. 3 is a view illustrating a simplified structure of the control system of the robot 1. As illustrated in FIG. 3, drivers 24 which correspond to the control axes J1-J4 of the arm 10 are provided, respectively. In this figure, one of the four drivers 24 is illustrated in detail, while others are omitted. Each driver 24 is connected with a servo controller 23, the servo controller 23 is connected with a host controller 22, and the control device 6 is constituted by these.

As an input device 62 which inputs an operational instruction into the host controller 22, a tablet computer having a graphical interface is used. The input device 62 and the control device 6 are capable of communicating wirelessly, and the instruction which a teaching person (operator) inputted into the input device 62 is inputted into the control device 6. This input device 62 is also provided with a function as a teach pendant which is an inputting means into the control device 6 when teaching the robot 1.

The control device 6 is a so-called computer, and has an arithmetic processor, such as a CPU, and a memory, such as a ROM and/or a RAM (none of them is illustrated). The memory stores a program to be executed by the arithmetic processor, various fixed data, etc. The arithmetic processor performs, for example, transmission and reception of data to/from an external device, such as the input device 62. Moreover, the arithmetic processor inputs a detection signal from various sensors and outputs a control signal to each controlled target. In the control device 6, the arithmetic processor reads and executes software, such as the program, stored in the memory, to perform processing for controlling various operation of the robot 1. Especially, the host controller 22 of the control device 6 is provided with at least a function as a teaching controller 22a which performs processing for controlling the operation of the robot 1 when teaching the robot 1. Note that the control device 6 may execute each processing by a centralized control by a single computer, or may execute each processing by a distributed control with a collaboration of a plurality of computers. Moreover, the control device 6 may be comprised of a microcontroller, a programmable logic controller (PLC), etc.

The host controller 22 generates a position instruction value, and outputs it to the servo controller 23. The servo controller 23 generates a drive instruction value (torque instruction value) based on the position instruction value acquired from the host controller 22, and outputs it to an amplifier circuit 26. The amplifier circuit 26 supplies drive current corresponding to the inputted drive instruction value to the servo motor M. The servo motor M is provided with the encoder E which detects the output rotational angle etc. thereof. The rotational angle detected by the encoder E is transmitted to the host controller 22 and the servo controller 23.

Figure 4:
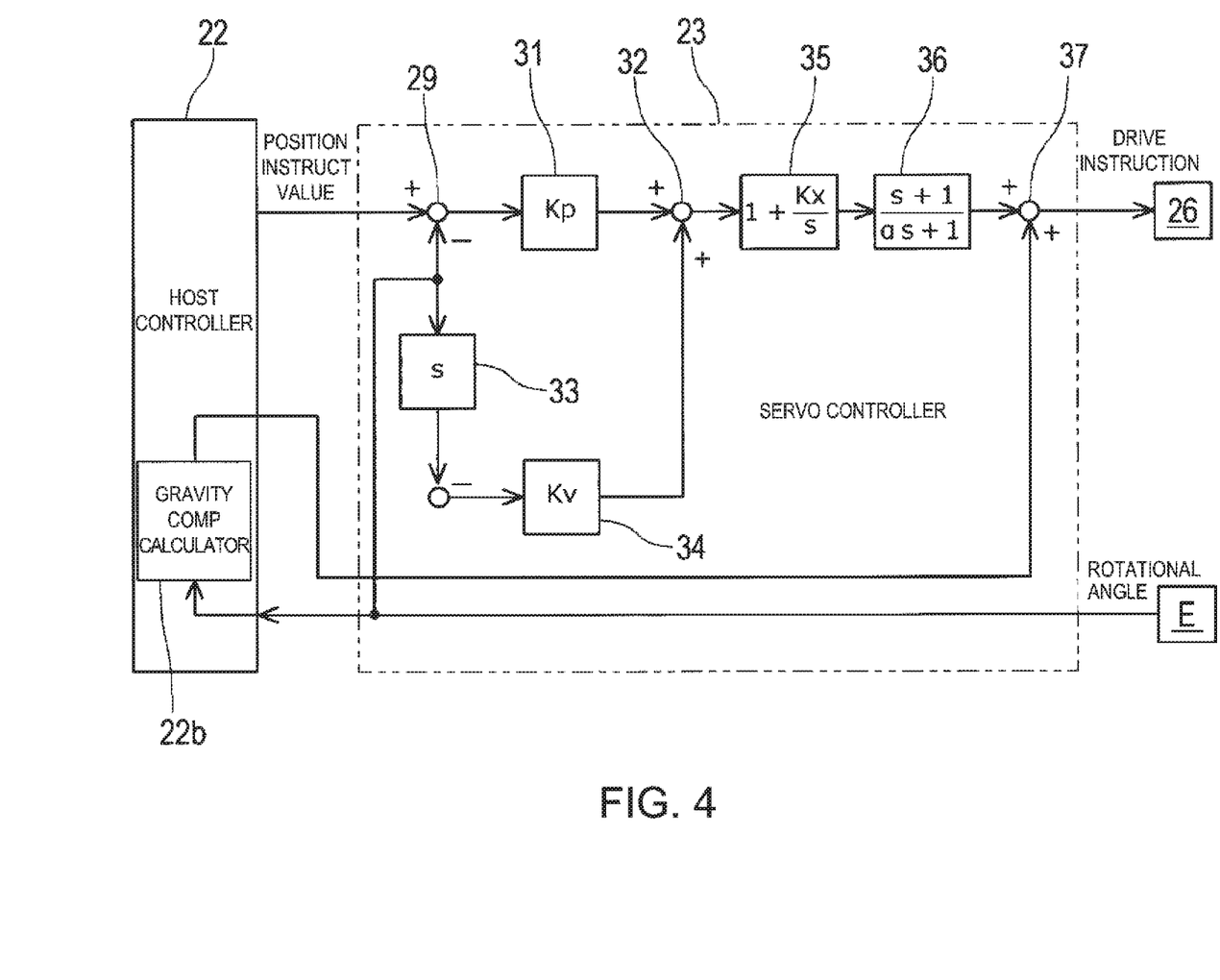
FIG. 4 is a view illustrating a concrete electric configuration focusing on a servo controller.

FIG. 4 is a view illustrating a concrete electric configuration focusing on the servo controller 23. As illustrated in FIG. 4, when the position instruction value is inputted into the servo controller 23 from the host controller 22, the inputted position instruction value is given to the plus-side input of a subtractor 29. A signal indicative of the rotational angle detected by the encoder E is given to the minus-side input of the subtractor 29. The subtractor 29 subtracts the rotational angle from the position instruction value.

The output of the subtractor 29 is given to a coefficient multiplier 31, where the output is amplified by a position gain Kp, and is given to one of inputs of an adder 32. The rotational angle from the encoder E is differentiated in a differentiation circuit 33, is further amplified by a speed gain Kv in a coefficient multiplier 34, and is then given to the other input of the adder 32. The output of the adder 32 is given to an integrator 35, where integration is performed. A gain G1 of the integrator 35 can be indicated by the following first formula. Note that, in the first formula (1), Kx is a constant and s is an operator.

$$G1 = 1 + \frac{Kx}{s} \quad (1)$$

The output of the integrator 35 is given to a phase compensator 36, where a calculation of phase compensation is performed when a phase control is activated. A gain G2 of the calculation of phase compensation in the phase compensator 36 can be indicated by the following second formula. Note that, in the second formula, a is a constant.

$$G2 = \frac{s+1}{\alpha s + 1} \quad (2)$$

The output of the phase compensator 36 is given to one of inputs of another adder 37. The output from a gravity compensation calculator 22b (gravity compensation value) which responds to the output of the encoder E is given and added to the other input of the adder 37, and the added output is inputted into the amplifier circuit 26 as the drive instruction value.

Note that, in the arm 10 according to this embodiment, a load caused by gravity acts on the third control axis J3 among the plurality of control axes J. Thus, the host controller 22 is provided with the gravity compensation calculator 22b in the control system of the third control axis J3. In the control systems of the drivers 24 of other control axes, the gravity compensation calculator 22b may not be provided, or even if it is provided, the output is set to zero. The gravity compensation calculator 22b calculates the gravity compensation value by a formula stored beforehand based on the rotational angle of the third control axis J3 detected by the encoder E. Thus, in the control system of the third control axis J3, the drive instruction value outputted from the servo controller 23 additionally takes the gravity compensation value outputted from the gravity compensation calculator 22b into consideration and, as a result, the driver 24 of the third control axis J3 operates so that a gravity compensation torque is generated.

Here, a flow of processing of the control device 6 when teaching the operation of the robot 1 is described. First, the teaching person inputs variety of information according to teaching into the control device 6 by using the input device 62.

For example, an arm selection screen where the arm 10 to be taught is selected is indicated on the input device 62. As the arm 10 to be taught, one or both of the arms 10A and 10B can be selected. Next, a teaching type selection screen where a teaching type is selected is indicated on the input device 62. The teaching person is selectable of, in this teaching type selection screen, any one of a plurality of teaching types, such as a remote control teaching using the input device 62 as a teaching pendant, and direct teaching. Here, if the direct teaching is selected, the arm-movement mode selection screen where an arm-movement mode is selected is displayed on the input device 62. The teaching person is selectable of, in this arm-movement mode selection screen, one of a free mode in which a given standard point K defined on the arm 10 or the tool 5 moves freely, and a restricted mode in which a movement route of the standard point K is restricted to a given straight line, a given plane, or rotation on a given axis. The standard point K is defined at an arbitrary point, for example, a representative point of the tool defined in a mechanical interface coordinate system of the wrist part 13, a wrist standard point, etc. Here, if the restricted mode is selected, a movement-restricted specified screen is displayed on the input device 62. The teaching person is selectable of, in this movement-restricted specified screen, the straight line, plane, or axis to which the movement of the standard point K of the arm 10 is restrained.

Figure 5:
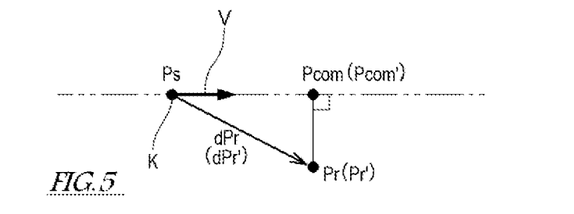
FIG. 5 is a conceptual diagram illustrating a movement of a standard point of a robotic arm.

Below, one example of a flow of processing of the control device 6 at the time of the restricted mode and the direct-teaching operation is described. In this example, as illustrated in FIG. 5, the standard point K is defined at the tip end of the arm 10, and the movement route of this standard point K is restricted to a direction parallel to a movement vector V from an initial position $P_S$. Then, the teaching person directly gives a force to the arm 10 or the tool 5 to move the standard point K along a given movement route illustrated by a two-dot chain line in the figure from the initial position $P_S$, while holding an initial posture S of the tool 5 at the initial position $P_S$.

During the teaching of the robot 1, gains of the position and speed of the control axis J of which the operation is permitted, among the control axes J of the robot 1, is set low enough. Thus, when the teaching person gives the external force to the arm 10 or the tool 5 to move the tool 5, a displacement is caused to the standard point K. When this is detected by the encoder E, a target position $P_{com}$ obtained by projecting the displacement of the standard point K on the given movement route, in other words, the target position $P_{com}$ of which a current position $P_r$ of the standard point K is replaced only by a direction component which the given movement route has, is obtained by the host controller 22. The host controller 22 generates a position instruction value $T_{com}$ corresponding to this target position $P_{com}$, and outputs it to the servo controller 23. Below, a flow of concrete processing performed by the host controller 22 of the control device 6 is described using FIG. 7.

Figure 7:
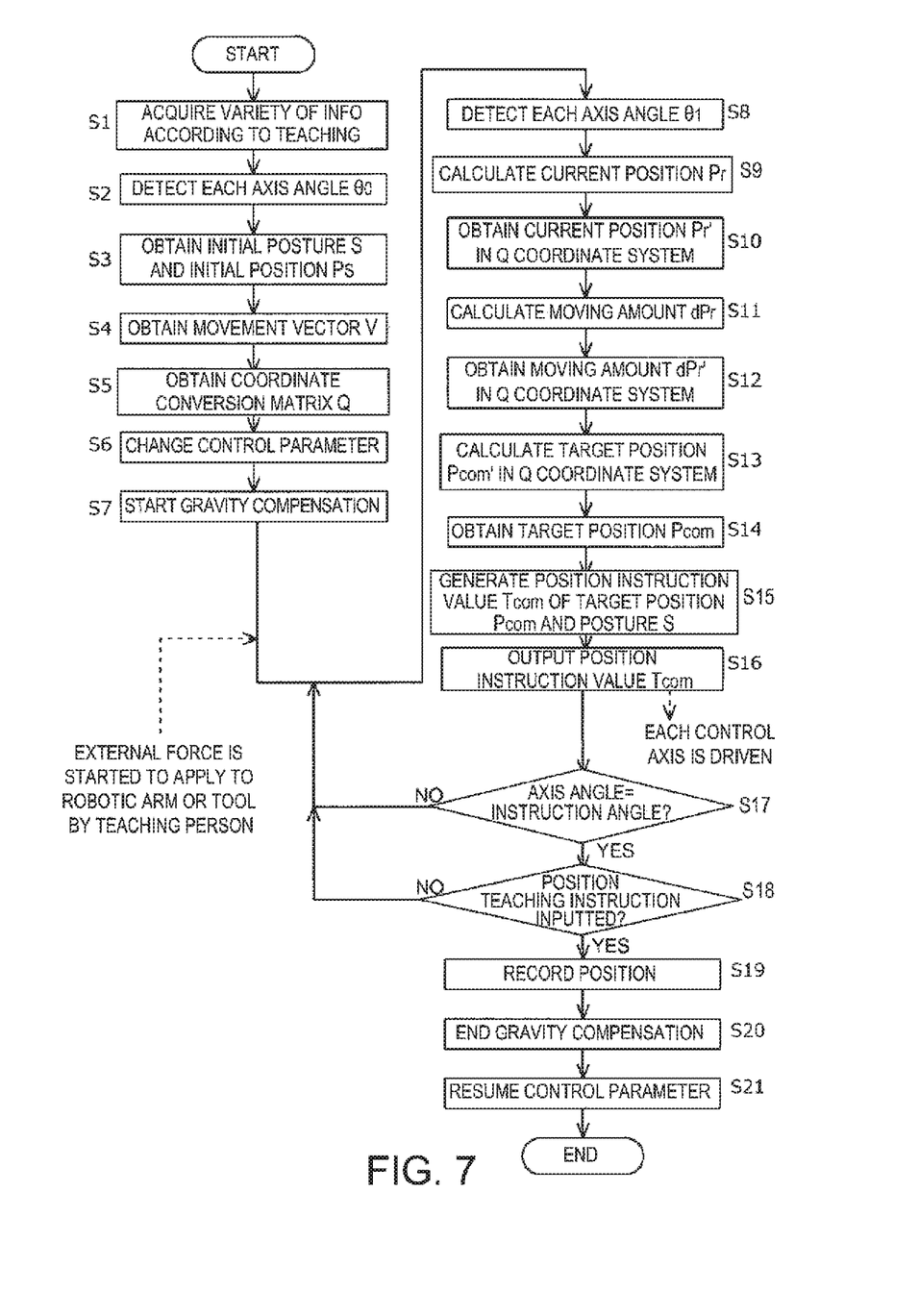
FIG. 7 is a view illustrating a flow of processing of a control device at the time of a direct-teaching operation.

As described above, the variety of information according to the teaching inputted into the input device 62 are transmitted to the control device 6, and the host controller 22 acquires the information (Step S1) and starts an arithmetic processing for generating the position instruction value $T_{com}$. The variety of information according to the teaching includes movement restriction information, such as the straight line, the plane, or the axis, to which the movement of the standard point K is restrained.

The host controller 22 which started the processing first acquires the rotational angle of each control axis J from the encoder E, and detects an initial axis angle $\theta_0$ of each control axis J based on the rotational angle (Step S2). Next, the host controller 22 obtains the initial position $P_S$ in the basic coordinate system of the standard point K of the arm 10 and the initial posture S of the tool 5 based on each axis angle $\theta_0$, and further obtains a posture rotation matrix $R(\theta_0)$ indicative of the initial position $P_S$ and the posture S (Step S3).

Then, the host controller 22 calculates the movement vector V (Step S4). The movement vector V is a unit vector indicative of a moving direction which the standard point K is permitted. The control device 6 obtains the movement vector V based on the acquired movement restriction information (i.e., information which identifies the movement route, such as the straight line, the plane, or the axis, on which movement is restrained). For example, when the movement route of the standard point K is restrained on a certain straight line, the movement vector V is a unit vector parallel to the straight line.

Moreover, the host controller 22 calculates a coordinate conversion matrix Q using the posture rotation matrix $R(\theta_0)$ etc. (Step S5). The coordinate conversion matrix Q is a matrix to convert coordinates in a reference coordinate system to coordinates in a new Q coordinate system. The coordinate conversion matrix Q is desirable to be a matrix indicative of such a conversion that the movement vector V becomes parallel to one of three perpendicular axes (x', y', and z'), for example, x'-axis, in the Q coordinate system.

Figure 6:
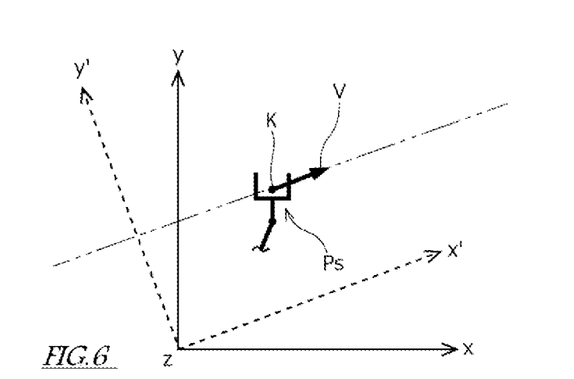
FIG. 6 is a view illustrating a coordinate conversion by a coordinate conversion matrix Q.

FIG. 6 is a view illustrating the coordinate conversion by the coordinate conversion matrix Q. As illustrated in FIG. 6, the coordinate conversion matrix Q is a matrix which performs such a conversion that the movement vector V and the x'-axis which is obtained by converting the x-axis in the basic coordinate system into the Q coordinate system become parallel. Thus, if the movement vector V is parallel to any one of the three perpendicular axes (x', y', and z') in the Q coordinate system, the calculation in the Q coordinate system becomes easy.

Next, the host controller 22 changes values of control parameters of the servo controller 23 (Step S6). Specifically, the position gain Kp of the coefficient multiplier 31 and the speed gain Kv of the coefficient multiplier 34 of the servo controller 23 corresponding to the control axis J of which the operation of the arm 10 to be taught is permitted are set small enough, a gain Kx of the integrator 35 is set to zero, the contents of the integrator 35 are cleared to zero and, further, the function of the phase compensator 36 is suspended. That is, it is configured so that the output of the adder 32 is given to the adder 37 as it is. Note that the change in the values of the control parameters (Step S6) may be performed between after Step S1 and before Step S8 described later, and the order of processings is not limited to this embodiment.

Further, the host controller 22 starts a gravity compensation of the control axis J which requires the gravity compensation (Step S7). In this embodiment, a calculation of the gravity compensation is started in the control system of the servo motor M3 which drives the control axis J3.

Here, the teaching person directly applies the force to an arbitrary part of the arm 10 or the tool 5 to move the arm 10 so that the standard point K is gradually moved to a desired teaching point. Although the position of the standard point K changes every moment during this movement, each control axis J of the arm 10 operates so that the movement of the standard point K is regulated on the given movement route and the force which the teaching person gives to the arm 10 or the tool 5 is assisted.

At Step S8, the host controller 22 detects an axis angle $\theta_1$ of each control axis J when the standard point K is displaced. The host controller 22 calculates a current position $P_r$ in the basic coordinate system of the standard point K based on the detected axis angle $\theta_1$ of each control axis J (Step S9). Further, at Step S10, the host controller 22 converts the calculated current position $P_r$ of the standard point K into a current position $P_r'$ of the standard point K in the Q coordinate system ($P_r'$=Q·Pr).

At Step S11, the host controller 22 obtains a moving amount $dP_r$ of the standard point K in the basic coordinate system based on the calculated current position $P_r$ in the basic coordinate system of the standard point K. Further, the host controller 22 converts the moving amount $dP_r$ into a moving amount $dP_r'$ of the standard point K in the Q coordinate system (Step S12).

At Step S13, the host controller 22 regards the position at which the current position $P_r'$ is projected on the given movement route (projected position) as a target position $P_{com}'$ in the Q coordinate system (see FIG. 5). In other words, the host controller 22 obtains the target position $P_{com}'$ in the Q coordinate system which is obtained by replacing the direction component which the given movement route has with the current position. For example, as for the target position $P_{com}'$ when the movement only in the x'-direction is permitted, the y' component and the z' component are 0, and the x' component is the x' component of the moving amount $dP_r'$. Moreover, for example, the target position $P_{com}'$ when the movement is permitted only in the x'y' plane, the z' component is 0, the x' component and the y' component are the x' component and the y' component of the moving amount $dP_r'$, respectively.

At Step S14, the host controller 22 inversely converts the target position $P_{com}'$ in the Q coordinate system into the basic coordinate system ($P_{com}=Q^{-1} \cdot P_{com}'$) to obtain the target position $P_{com}$ in the basic coordinate system.

At Step S15, the host controller 22 generates a position instruction value $T_{com}$ corresponding to the target position $P_{com}$ and the posture S. At last, the host controller 22 outputs this position instruction value $T_{com}$ to the servo controller 23 (Step S16). As a result, each control axis J is driven based on the position instruction value $T_{com}$ to operate the arm 10.

While the standard point K of the arm 10 continues being displaced, processing from Steps S8 to S16 is repeated at a given interval. In the meantime, since a deviation has occurred in an instruction angle $\theta_{com}$ corresponding to the position instruction value $T_{com}$ and the detected axis angle $\theta$ of each control axis J, each driver 24 is negatively-feedback-controlled so that this deviation becomes a given value or below. Note that the given value may be an arbitrary small value close enough to zero. Thus, in order for the teaching person to move the arm 10, the force given to the arm 10 is assisted.

Then, when the standard point K of the arm 10 reaches the desired teaching position of the teaching person and the teaching person stops applying the external force, the deviation of the instruction angle $\theta_{com}$ and the detected axis angle $\theta$ of each control axis J becomes the given value or below (NO at Step S17), the operation of the arm 10 stops, and the assisting force by the robot 1 stops. When the arm 10 stops displacing, the host controller 22 urges the teaching person to input a position teaching instruction through the input device 62. If the teaching person acquires the position teaching instruction inputted into the host controller 22 through the input device 62 (YES at Step S18), the host controller 22 records current positional information on the standard point K as one of the teaching positions (Step S19), ends the gravity compensating calculation (Step S20), and resumes the control parameters, such as the gains of the control system (Step S21).

As described above, the method of teaching the robot according to this embodiment is characterized by including repeating for each control axis J, that detecting the axis angle $\theta_1$ of each control axis J of the arm 10 during the direct teaching of the robot 1, obtaining the current position $P_r$ of the standard point K of the arm 10 based on each axis angle $\theta_1$, generating the position instruction value $T_{com}$ that uses the position obtained by projecting the current position $P_r$ on the given movement route (moving direction) as the target position $P_{com}$, and driving the each control axis J based on the position instruction value $T_{com}$, until the deviation of the axis angle (instruction angle $\theta_{com}$) corresponding to the position instruction value $T_{com}$ and the detected axis angle $\theta$ reaches the given value or below, for each control axis J, and teaching the robot 1 the positional information on the arm 10 after the deviation becomes the given value or below. Here, the movement of the standard point K of the arm 10 under the direct teaching of the robot 1 is restricted to the given movement route.

Moreover, the robot control device (control device 6) according to this embodiment is the robotic arm control device which moves the standard point K set on the robotic arm 10, and is characterized by including detecting the axis angle $\theta_1$ of each control axis J of the robotic arm 10, obtaining the current position $P_r$ of the standard point K based on the axis angle $\theta_1$, obtaining the projected position (i.e., the target position $P_{com}$) obtained by projecting the current position $P_r$ on the prestored movement route, generating the position instruction value $T_{com}$ based on the projected position, and further moving the standard point K based on the position instruction value $T_{com}$.

According to the method of teaching the robot and the control device 6, during the direct teaching of the robot 1, the control device 6 detects each axis angle $\theta_1$, calculates the current position $P_r$ based on the axis angle $\theta_1$, obtains the target position $P_{com}$ by projecting the current position $P_r$ on the given movement route (moving direction), and repeats the arithmetic processing to generate the position instruction value $T_{com}$ based on the target position $P_{com}$.

Thus, during the direct teaching of the robot 1, since each control axis J of the arm 10 is driven based on the position instruction value $T_{com}$, the arm 10 operates itself so as to assist the external force which the teaching person gives to the arm 10 or the tool 5. Here, since the position instruction value $T_{com}$, is changed in turn based on each axis angle $\theta_1$ which changes in turn, the standard point K will not move beyond the intention of the teaching person. Therefore, upon the positioning of the standard point K in a desired teaching position, fine tuning of the position of the arm 10 and/or the tool 5 is easy. Moreover, since the robot 1 is capable of performing the operation described above by demonstrating the functions which it has conventionally, an external-force detecting means for detecting the external force given to the arm 10, and a control therefor are unnecessary.

Note that, in the embodiment described above, although the driving each control axis J based on the position instruction value $T_{com}$ is repeated until the deviation of the axis angle (instruction angle $\theta_{com}$) corresponding to the position instruction value $T_{eom}$, and the detected axis angle $\theta$ reaches the given value or below, for each control axis J, the termination of the repeat processing may be determined based on the current position of the standard point K, instead of the axis angle $\theta$. That is, the driving each control axis J based on the position instruction value $T_{com}$ may be repeated until the deviation of the position instruction value $T_{com}$ and the current position of the standard point K corresponding to the detected axis angle $\theta$ reaches a given value or below.

Moreover, during the direct teaching of the robot 1, since the movement of the standard point K is restricted to the given movement route (given moving direction), the standard point K moves along the given movement route even if the direction of the external force which the teaching person gives to the arm 10 or the tool 5 does not match with the moving direction of the standard point K. Therefore, it becomes easy to move the standard point K to the desired position of teaching person. Moreover, since the force which the teaching person gives to the arm 10 or the tool 5 is assisted by the operation of each control axis J under the direct teaching, the teaching person is able to move an axis with a large static frictional force (e.g., the first control axis J1 on a base end side) etc. with a comparatively small force. Note that, in this embodiment, although the method of teaching the robot 1 having the four control axes J1-J4 per one arm 10 is described, the number of control axes J of the robot 1 is not limited to the above number.

Moreover, in the method of teaching the robot according to the embodiment described above, the position gain and the speed gain of each control axis J can be set arbitrarily. In this embodiment, among the control axes J of the robot 1, each gain of the position and speed of the control axis J of which the operation is permitted during the direct teaching is set low enough.

Thus, the axis is easily displaced by the force which the teaching person gives to the arm 10 or the tool 5. Further, the assisting force can also be generated for a slight force which the teaching person gives to the arm 10 or the tool 5.

Moreover, in the method of teaching the robot according to the embodiment described above, the gravity compensating calculation is performed to at least one of the control axes J (third control axis J3), and the calculated result is added to the torque instruction value (drive instruction value) of the control axis.

Thus, even if the posture of each control axis J of the arm 10 changes during the direct teaching of the robot 1, the gravity compensation corresponding to the posture can correctly be performed.

Moreover, in the method of teaching the robot according to the embodiment described above, before the teaching person moves the arm 10 or the tool 5, the initial posture S of the tool 5 is obtained based on the axis angle $\theta_0$ of each control axis J, and the position instruction value $T_{com}$ is generated while the teaching person is moving the arm 10 or the tool 5 so that the initial posture of the tool 5 is maintained.

Thus, only the arm 10 can be moved during the direct teaching of the robot 1, while the initial posture S of the tool 5 is maintained. That is, only the position of the tool 5 can be changed, while the initial posture S of the tool 5 is maintained. Note that, although the initial posture S of the tool 5 is maintained during the direct teaching of the robot 1 in the embodiment described above, the position and posture of the tool 5 may be changed according to the movement of the arm 10, or the position of the tool 5 may be fixed and only the posture of the tool 5 may be changed, during the direct teaching of the robot 1.

Moreover, in the method of teaching the robot according to the embodiment described above, the restricted mode in which the movement of the standard point K is limited to the given movement route and the free mode in which the movement of the standard point K is not restricted to the given movement route, can be selected.

Thus, since the restricted mode and the free mode can be selected in the direct teaching, the teaching person can select the mode according to the situation, and the arm 10 and/or the tool 5 can easily be moved according to the intention of the teaching person.

Note that, in the method of teaching the robot according to the embodiment described above, as illustrated in FIG. 6, the given movement route of the standard point K is defined on a certain straight line parallel to the x-y plane in three perpendicular axes (x, y, and z) in the basic coordinate system. Note that, in the present disclosure, the given movement route (moving direction) is not limited to this direction, but is suitably determined based on a relation of the initial position $P_S$ of the standard point K and the next teaching position.

For example, the given movement route of the standard point K may be on a straight line parallel to any one of directions of three perpendicular axes (x, y, and z) in the basic coordinate system, or any one of the directions of the three perpendicular axes (x, y, and z) in a tool coordinate system. Moreover, for example, the given movement route of the standard point K may be on a plane parallel to a plane defined by a combination of two of the three perpendicular axes (x, y, and z) in the basic coordinate system, or a combination of two of the three perpendicular axes (x, y, and z) in the tool coordinate system. Moreover, for example, the given movement route of the standard point K may be on a rotation locus which uses any one of the three perpendicular axes (x, y, and z) in the basic coordinate system, or any one of the three perpendicular axes (x, y, and z) in the tool coordinate system, as the center of rotation.

Moreover, in the method of teaching the robot according to the embodiment described above, upon generating the position instruction value $T_{com}$ from the current position $P_r$, the movement vector V on the given movement route is obtained, the coordinate conversion matrix Q which converts the basic coordinate system into the Q coordinate system is obtained so that the movement vector V becomes parallel to any one of the three perpendicular axes (x', y', and z') in the new Q coordinate system, the current position $P_r$ of the standard point K in the basic coordinate system is converted into the Q coordinate system, the position obtained by projecting the current position $P_r'$ in the Q coordinate system on the given movement route is used as the target position $P_{com}'$ in the Q coordinate system, and the target position $P_{com}'$ is converted into the basic coordinate system to obtain the target position $P_{com}$.

Thus, by utilizing the coordinate conversion, the arithmetic processing of the control device 6 is simplified.

As described above, according to the method of teaching the robot according to this embodiment, in the direct teaching of the robot 1, the operability of the arm 10 and/or the tool 5 is totally improved when the teaching person directly gives the force to move the arm 10 or the tool 5.

The suitable embodiment of the present disclosure is described above. It is apparent for a person skilled in the art that many improvements and other embodiments of the present disclosure are possible from the description. Therefore, the above description is to be interpreted only as illustration, and it is provided in order to teach a person skilled in the art the best mode that implements the present disclosure. Details of the structures and/or functions may substantially be changed without departing from the spirit of the present disclosure.

DESCRIPTION OF REFERENCE CHARACTERS

1: Robot
5: Tool
6: Control Device
10, 10A, 10B: Arm
22: Host Controller
22b: Gravity Compensation Calculator
23: Servo Controller
24: Driver
26: Amplifier Circuit
62: Input Device
E (E1-E4): Encoder
J (J1-J4): Control Axis
K: Standard Point
M (M1-M4): Servo Motor

What is claimed is:

1. A method of teaching a robot of a direct teaching type, in which the robot having at least one robotic arm to which a tool is attached is taught a position by a teaching person directly applying a force to move the robotic arm or the tool, comprising:
  restricting movement of a standard point defined on the robotic arm or the tool to a given movement route;
  repeating for each control axis, that an axis angle of each control axis of the robotic arm is detected, while the teaching person is moving the robotic arm or the tool, a current position of the standard point is obtained based on the axis angle, a position instruction value that uses a position obtained by projecting the current position on the given movement route is generated as a target position, and the each control axis is driven based on the position instruction value, until a deviation of the axis angle corresponding to the position instruction value and the detected axis angle, or a deviation of the position instruction value and the current position of the standard point corresponding to the detected axis angle reaches a given value or below; and teaching, after the deviation becomes the given value or below, positional information on the robotic arm to the robot.

2. The method of claim 1, wherein a position gain and a speed gain of the each control axis are allowed to be set arbitrarily.

3. The method of claim 1, comprising performing a gravity compensating calculation to at least one of the control axes, and adding the calculated result to a torque instruction value of the control axis.

4. The method of claim 1, comprising obtaining, before the teaching person moves the robotic arm or the tool, an initial posture of the tool based on the axis angle of each control axis, and generating the instruction value of the each control axis so that the initial posture of the tool is maintained while the teaching person is moving the robotic arm or the tool.

5. The method of claim 1, wherein a restricted mode in which the movement of the standard point is restricted to the given movement route and a free mode in which the movement of the standard point is not limited to the given movement route are selectable.

6. The method of claim 1, wherein the given movement route of the standard point is on a straight line parallel to any one of directions of three perpendicular axes (x, y, and z) in a basic coordinate system, or any one of directions of three perpendicular axes (x, y, and z) in a tool coordinate system.

7. The method of claim 1, wherein the given movement route of the standard point is on a plane parallel to a plane defined by a combination of two of three perpendicular axes (x, y, and z) in a basic coordinate system, or a combination of two of three perpendicular axes (x, y, and z) in a tool coordinate system.

8. The method of claim 1, wherein the given movement route of the standard point is on a rotation locus that uses any one of three perpendicular axes (x, y, and z) in a basic coordinate system, or any one of three perpendicular axes (x, y, and z) in a tool coordinate system, as the center of rotation.

9. The method of claim 1, wherein the generating the position instruction value from the current position includes:
obtaining a movement vector on the given movement route;
obtaining a coordinate conversion matrix that converts the basic coordinate system into a new coordinate system so that the movement vector becomes parallel to any one of three perpendicular axes (x, y, and z) in the new coordinate system;
converting the current position of the standard point in the basic coordinate system into the new coordinate system; and
using a position obtained by projecting the current position in the new coordinate system on the given movement route, as a target position in the new coordinate system, and obtaining the target position by converting the target position into the basic coordinate system.

10. A robotic arm control device, that moves a standard point set on a robotic arm, wherein,
an axis angle of each control axis of the robotic arm is detected,
a current position of the standard point is obtained based on the axis angle,
a projected position is obtained by projecting the current position on a prestored movement route,
a position instruction value is generated based on the projected position, and
the standard point is further moved based on the position instruction value.

* * * * *